United States Patent

[11] 3,595,099

[72] Inventors Ilya Ilich Ivashkov
 9 Parkovaya ulitsa 43/26, kv. 198;
 Vasily Alexandrovich Frolovtsev,
 Ferganskaya ulitsa, 18, kv. 263, both of
 Moscow, U.S.S.R.
[21] Appl. No. 279
[22] Filed Jan. 2, 1970
[45] Patented July 27, 1971

[54] FLAT-LINK CHAIN
 1 Claim, 2 Drawing Figs.
[52] U.S. Cl. ................................................ 74/251 R
[51] Int. Cl. .................................................. F16g 13/04
[50] Field of Search ......................................... 74/251 R,
 245 LP

[56] References Cited
 UNITED STATES PATENTS
 799,073 9/1905 Morse ........................ 74/251 S Primary Examiner—Leonard H. Gerin
Attorney—Waters, Roditi, Schwartz & Nissen ABSTRACT: A flat-link chain, hinge joints of whose links are formed by supporting members secured at the end portions of plates and contacting each other by their external working surfaces of which one is convex and the other is concave, in which chain the angle, formed by the planes passing through the axis of the supporting member having a convex working surface and the edges of the working surfaces of the supporting member having a concave working surface, and embracing the concave working surface is not less than $720°/n$, wherein $n$ is the number of teeth of the smallest sprocket with which the chain may cooperate. The proposed chain is reliable and durable in operation with sprockets having any predetermined number of teeth.

PATENTED JUL 27 1971                3,595,099

FLAT-LINK CHAIN

The present invention relates to the sphere of machine building and, more particularly, to flat-link chains.

Known in the prior art are flat-link chains wherein the hinge joints of the links are formed by supporting members secured at the end portions of plates and contacting each other by their external working surfaces, of which one is convex and the other is concave. In such chains the supporting members having concave working surfaces are secured in plates having holes for the passage of the supporting members having convex working surfaces. During the chain drive operation, when the chain-supporting members contact the sprocket teeth, there arises a danger that the supporting member having a convex working surface may roll out of the recess provided in the supporting member having a concave working surface, due to which fact the supporting member having a convex working surface starts contacting the edge of the hole made in the plate, through which it is loosely passed, which results in quick wear and breakage of the chain.

This danger increases with a decrease in the member of the teeth of the sprockets interacting with the chain.

It is an object of the present invention to provide such a flat-link chain that would ensure a normal contact of the supporting members and prevent rolling-out of one of them from the recess of the other when the chain is engaged with the sprocket having a predetermined minimum number of teeth.

This object is accomplished by means of a flat-link chain the hinge joints of whose links are formed by supporting members secured at the end portions of plates and contacting each other by their external working surfaces, of which one is convex and the other is concave in which chain the angle, formed by the planes passing through the axis of the supporting member having a convex working surface and the edges of the working surface of the supporting member having a concave working surface, and embracing the concave working surface is no less than $720°/n$, wherein $n$ is the number of teeth of the smallest sprocket with which the chain cooperates.

The following description of an exemplary embodiment of the present invention is given with reference to the accompanying drawings, in which.

Figure 1:
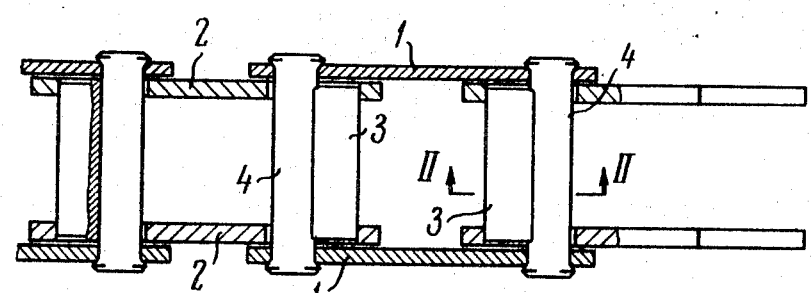
FIG. 1 shows a cross section of the flat-link chain, according to the invention.

The flat-link chain comprises external plates 1 (FIG. 1), internal plates 2, supporting members 3 having concave working surfaces and supporting members 4 having convex working surfaces, the supporting members 3 and 4 forming hinge joints of the chain.

Figure 2:
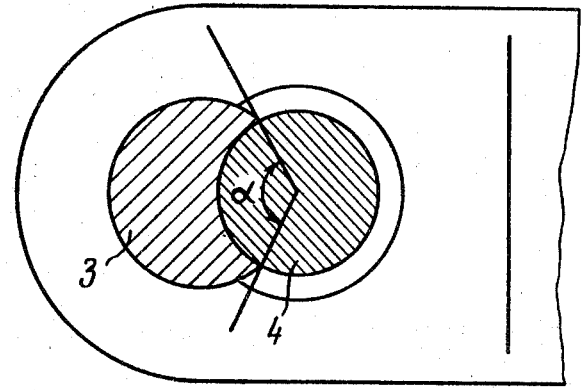
FIG. 2 is a section taken along line II-II of FIG. 1, on an enlarged scale.

The angle $\alpha$ (FIG. 2) formed by the planes passing through the axis of the supporting member 4 and the edges of the working surface of the supporting member 3 is not less than $720°/n$, wherein $n$ is the number of teeth of the smallest sprocket with which the chain cooperates.

The proposed chain possesses the advantage which consists in that even under most unfavorable working conditions, including the case when the chain is engaged with sprockets having a minimum predetermined number of teeth, the edges of the plates holes are not worn out and the chain is not quickly destroyed.

What we claim is:

1. A flat-link chain comprising plates; hinge joints of said plates; supporting members having external convex working surfaces; supporting members having external concave working surfaces; said supporting members contacting in pairs with each other by their said working surfaces and forming said hinge joints, the angle formed by the planes passing through the axis of said supporting member with a convex working surface and the edges of said working surface of the supporting member with a concave working surface and embracing said concave working surface being not less than $720°/n$, wherein $n$ is the number of teeth of the smallest sprocket with which the chain cooperates.